(12) United States Patent
Cheng

(10) Patent No.: US 10,010,033 B2
(45) Date of Patent: Jul. 3, 2018

(54) HYDROPONIC DEVICE

(71) Applicant: Sheng-Hsiung Cheng, New Taipei (TW)

(72) Inventor: Sheng-Hsiung Cheng, New Taipei (TW)

( * ) Notice: Subject to any disclaimer, the term of this patent is extended or adjusted under 35 U.S.C. 154(b) by 145 days.

(21) Appl. No.: 14/987,776

(22) Filed: Jan. 5, 2016

(65) Prior Publication Data

US 2017/0188530 A1    Jul. 6, 2017

(51) Int. Cl.
*A01G 31/00* (2018.01)
*A01G 31/02* (2006.01)

(52) U.S. Cl.
CPC .................................. *A01G 31/02* (2013.01)

(58) Field of Classification Search
CPC ...... A01G 31/02; A01G 31/003; A01G 31/04; A01G 31/06; A01G 31/0245; A01G 2031/003; A01G 9/1026; A01G 9/1066; A01G 5/04; A01G 5/00; A01G 9/10; A01G 31/00
USPC ... 47/60, 61, 62 R, 62 A, 63, 1.1, 85, 86, 56
See application file for complete search history.

(56) References Cited

U.S. PATENT DOCUMENTS

| | | | | |
|---|---|---|---|---|
| 1,360,669 | A * | 11/1920 | Nielsen | A01G 9/1423 47/18 |
| 3,823,508 | A * | 7/1974 | Takehara | A01G 31/02 47/63 |
| 3,868,787 | A * | 3/1975 | Wong, Jr. | A01G 31/02 47/41.13 |
| 2016/0021838 | A1* | 1/2016 | Cheng | A01G 31/02 47/62 R |
| 2017/0086399 | A1* | 3/2017 | Anderson | A01G 29/00 |

FOREIGN PATENT DOCUMENTS

NL          9100112 A * 8/1992 ............. A01G 31/02

* cited by examiner

*Primary Examiner* — Peter M Poon
*Assistant Examiner* — Ebony E Evans
(74) *Attorney, Agent, or Firm* — Leong C. Lei

(57) ABSTRACT

The hydroponic device contains support members, at least a frame member placed on the support members; a cover member placed on the support members covering the frame member. The frame member contains a base element and a number of extension elements. The base element is for the installation of an absorbing piece where seeds are placed. Each extension element has at least a through slot where a positioning pin of the base element or a previous extension element is slidably embedded. The base element and the extension elements are as such collapsible and expandable along a lateral direction on the support members so as to provide room of growth for the seeds.

4 Claims, 8 Drawing Sheets

HYDROPONIC DEVICE

BACKGROUND OF THE INVENTION (a) Technical Field of the Invention

The present invention is generally related to hydroponics, and more particular to a hydroponic device.

(b) Description of the Prior Art

For conventional hydroponics, vegetable seeds are placed in a cultivation device and the vegetable seeds grow by absorbing culture fluid. Usually, the vegetables have to be transplanted according to their days of growth. For example, between the first day to the third day, they are placed in a first zone. Then, between the fourth and the sixth days, they are moved to a second zone. Between the seventh and the ninth days, they are moved to a third zone, and so on. As such, the vegetables are harvested at the most appropriate time. However, this process is laborious and time consuming, and detailed record of growth has to be maintained. The present applicant therefore has already taught a hydroponic device in Republic of China, Taiwan, Patent No. M494481, but there is still room for more improvement.

SUMMARY OF THE INVENTION

A major objective of the present invention is to teach a hydroponic device so as to facilitate the provision of the room of growth for vegetables so that the hydroponic process is more convenient and efficient.

The hydroponic device contains support members, at least a frame member placed on the support members; a cover member placed on the support members covering the frame member. The frame member contains a base element and a number of extension elements. The base element is for the installation of an absorbing piece where seeds are placed. Each extension element has at least a through slot where a positioning pin of the base element or a previous extension element is slidably embedded. The base element and the extension elements are as such collapsible and expandable along a lateral direction on the support members so as to provide room of growth of the seeds.

Each extension element has a U shape and the extension elements have dimensions such that they are sequentially embedded in a space formed by a next extension element's U shape. Each through slot is configured along an arm of the U shape. The base element and the extension elements other than an outmost one have a positioning pin outwardly extended from each arm's corner of the U shape perpendicular to the arm. The base element and the extension elements other than the outmost one has its positioning pins embedded in the through slots of a next extension element.

The base element has at least a hook along a front side. An outmost extension element has a fastening piece along a back side so as to engage the hook of a next frame member. A number of frame members are as such cascaded by linking their respective hooks and fastening elements.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
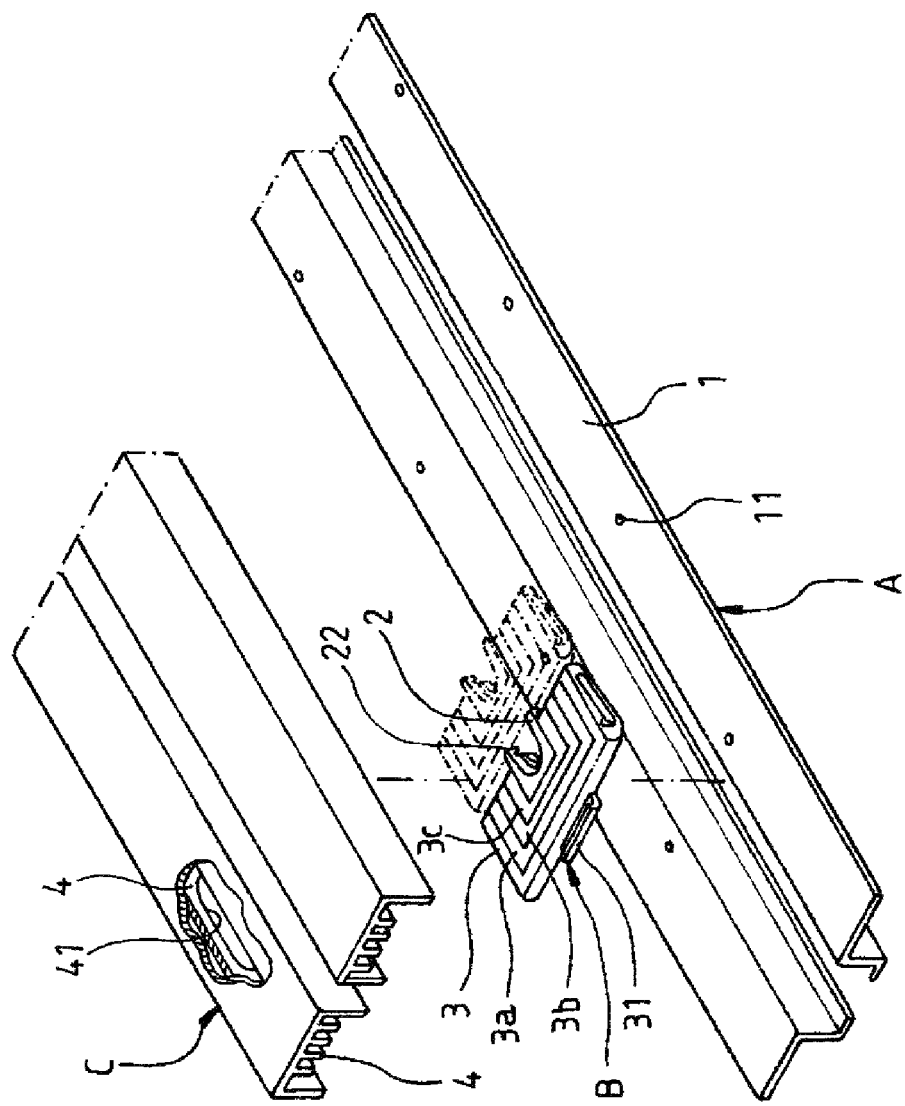
FIG. 1 is a perspective break-down diagram showing a hydroponic device according to an embodiment of the present invention.
Figure 1A:
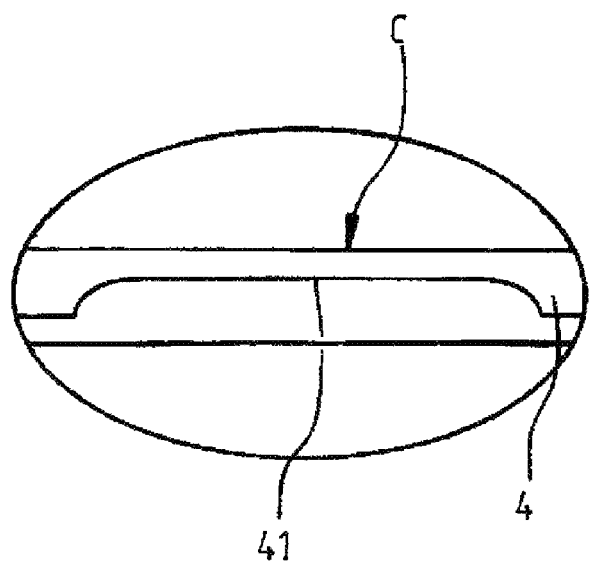
FIG. 1A is a schematic diagram showing a rib of a cover member of the hydroponic device of FIG. 1.
Figure 2:
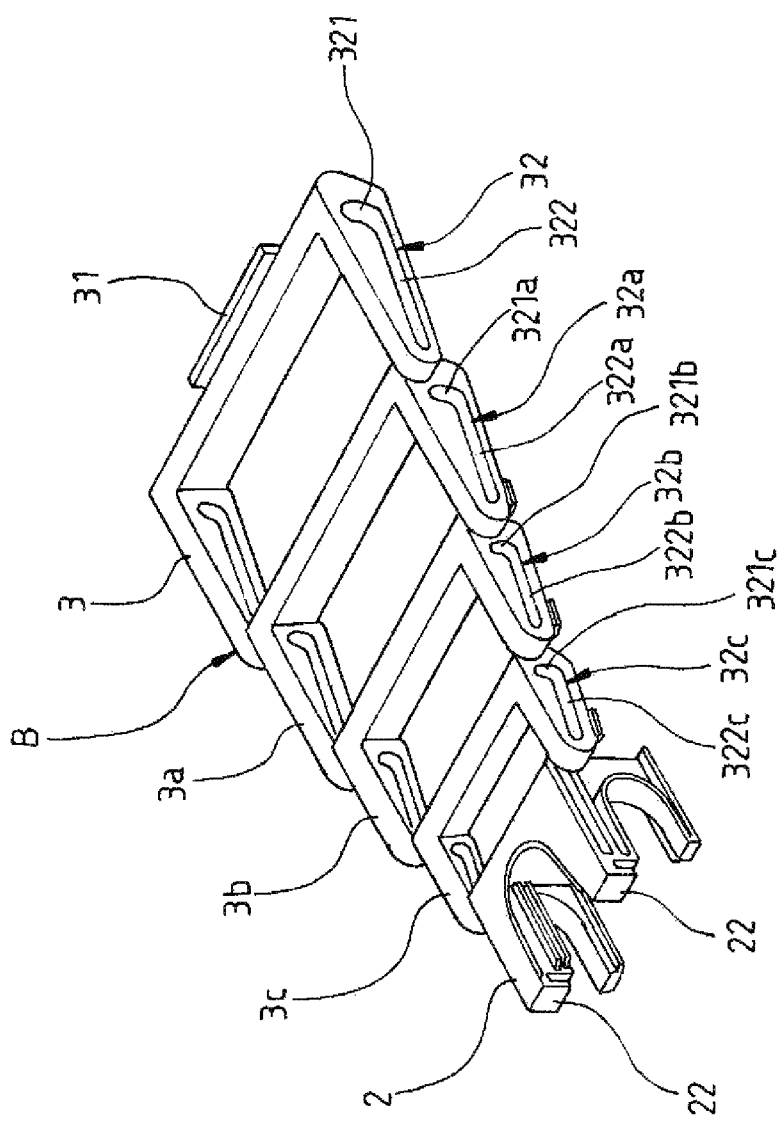
FIG. 2 is a perspective diagram showing a frame member of the hydroponic device of FIG. 1 when it is expanded.
Figure 3:
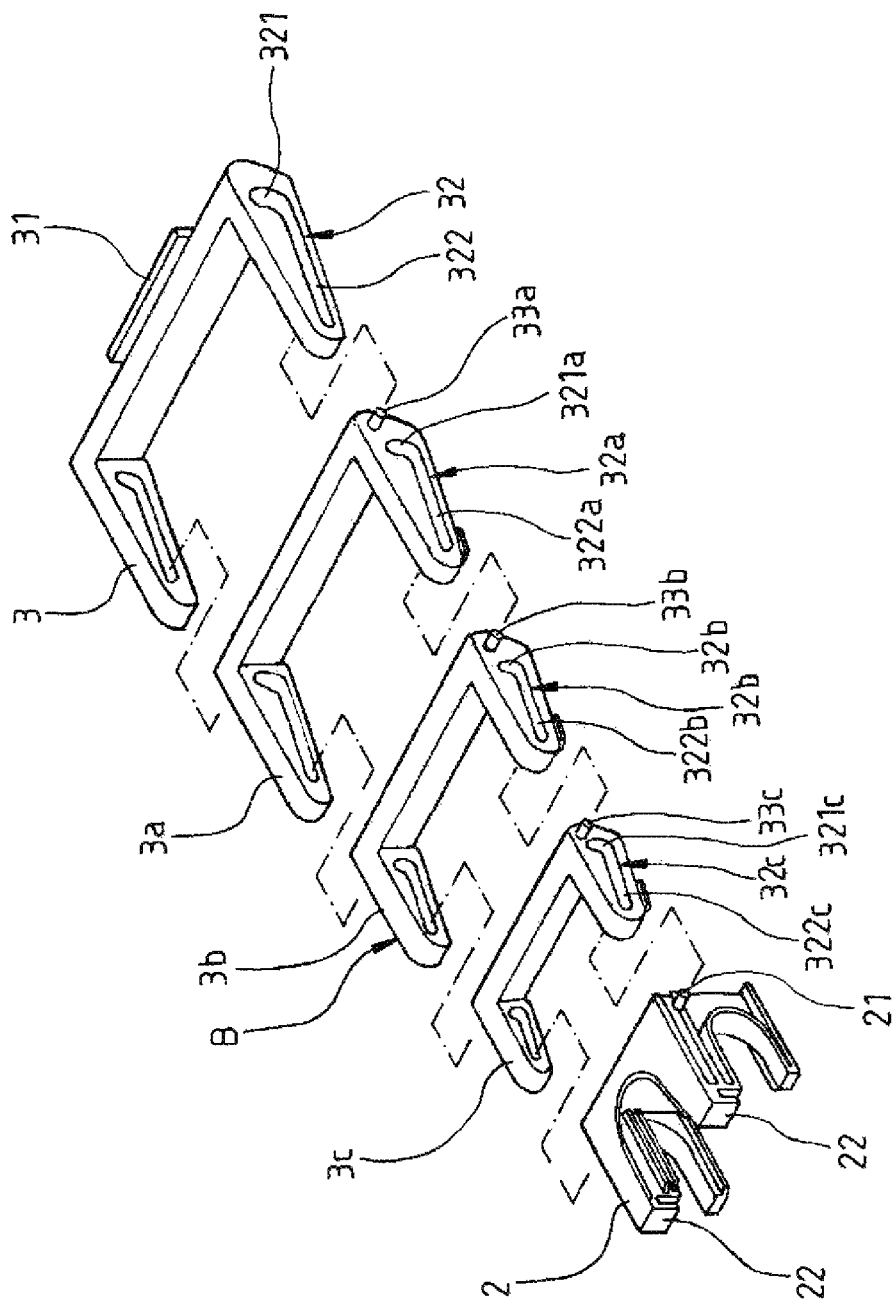
FIG. 3 is a perspective break-down diagram showing the frame member of FIG. 2.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1, 1A, 2, and 3, a hydroponic device according to an embodiment of the present invention contains a number of support members A, at least a frame member B placed on the support members A, and a cover member C placed on the support members A covering the frame member B. Each support member A has a flat top face 1 and a number of projections 11 arranged at intervals from an inner edge adjacent to a front end of the support member towards an outer edge adjacent to a back end.

The frame member B contains a base element 2 and a number of U-shaped extension elements 3, 3a, 3b, and 3c. The base element 2 has a positioning pin 21 on each lateral side and at least a hook 22 along a front side. The extension elements 3, 3a, 3b, and 3c have dimensions such that they are sequentially embedded in a space formed by a next extension element's U shape in the aforementioned order with the extension element 3 being the outmost one. The outmost extension element 3 has a fastening piece 31 along a back side. Each extension element 3, 3a, 3b, 3c has an L-shaped through slot 32, 32a, 32b, 32c along each arm of the U shape. Each slot 32, 32a, 32b, 32c contains a lateral section 322, 322a, 322b, 322c, and a vertical section 321, 321a, 321b, 321c. Except the outmost extension element 3, each of the other extension elements 3a, 3b, and 3c has a positioning pin 33a, 33b, 33c outwardly extended from each arm's corner of the U shape perpendicular to the arm. As such, the base element 2 has its positioning pins 21 embedded in the slots 32c Similarly, the extension elements 3a, 3b, and 3c have their respective positioning pins 33a, 33b, and 33c embedded in the slots 32, 32a, and 32b of the extension elements 3, 3a, and 3b, respectively. Ordinarily, positioning pins 33a, 33b, 33c are in the vertical sections 321, 321a, 321b of the slots 32, 32a, 32b, respectively, so that the extension elements 3, 3a, 3b, and 3c are collapsed together. On the other hand, when the positioning pins 33a, 33b, 33c are in the lateral sections 321, 321a, 321b of the slots 32, 32a, 32b, respectively, the positioning pins 33a, 33b, 33c can slide along the slots 32, 32a, 32b, so that the extension elements 3, 3a, 3b, and 3c are expanded. Each arm of the extension elements 3, 3a, 3b, and 3c has a slant bottom side, and each lateral section 322, 322a, 322b, 322c is arranged along the bottom side.

Each cover member C is positioned on the support members A. Inside each cover member C, there are downward extending ribs 4, each corresponding to an extension element 3, 3a, 3b, or 3c. Each rib 4 has an indentation 41 corresponding to a protrusion 11 of the support members A.

With these components, a hydroponic device is formed. According to the present invention, a number of frame members B are cascaded by engaging the hooks 22 and the fastening pieces 31 from neighboring extension elements. The series of frame members B is then placed on the support members A mounted on a bucket's open top. The extension elements 3, 3a, 3b, and 3c are expanded if required to provide additional space for the vegetable to grow.

Figure 4:
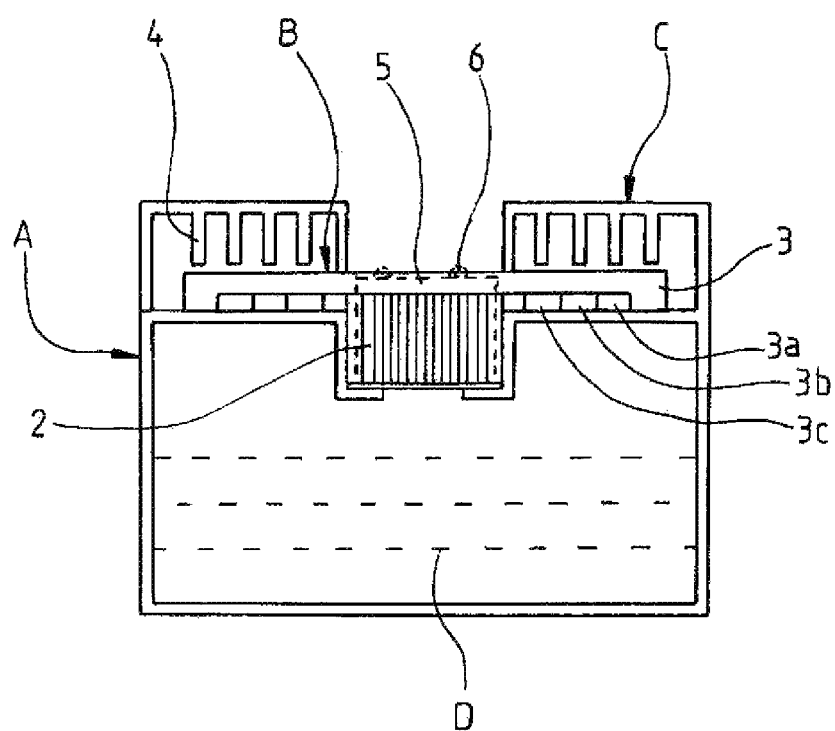
FIG. 4 is a cross-sectional diagram showing the application of the hydroponic device of FIG. 1.

As shown in FIG. 4, an absorbing piece 5 is configured in the base element 2 of each frame member B with vegetable seeds 6 placed on the absorbing piece 5. Culture fluid D is stored in the bucket. The absorbing piece 5 would absorb the culture fluid D for the vegetable seeds 6.

Figure 5:
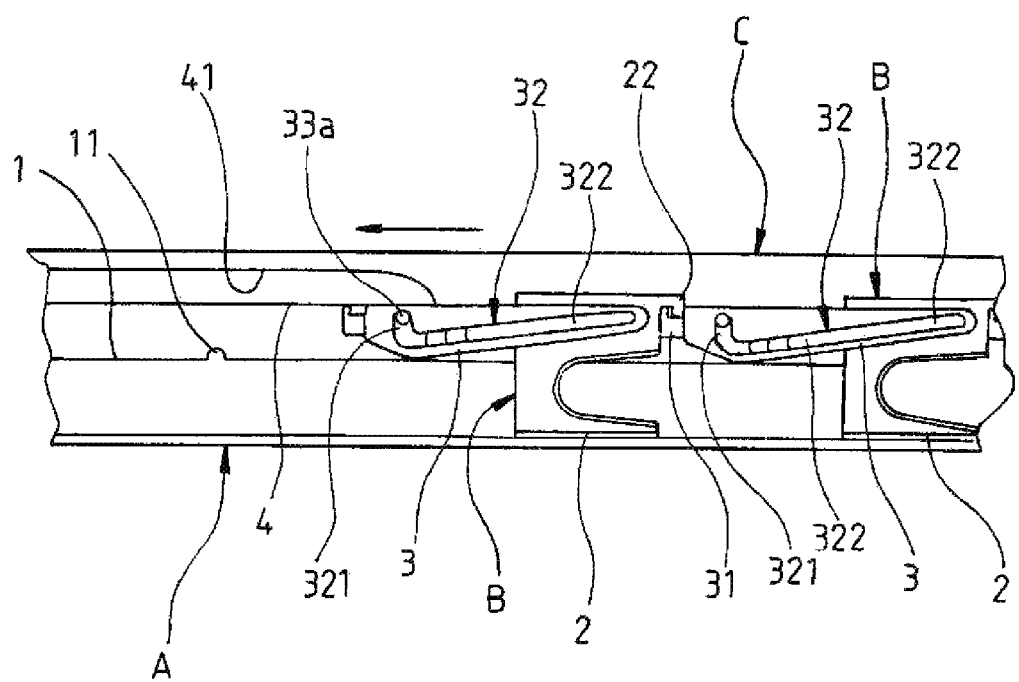
FIG. 5 is a sectional diagram showing a scenario of a number of cascaded frame members.

As shown in FIG. 5, as the vegetable grows, the extension elements of each frame member B are expanded laterally towards an end of the support members A. When the extension element 3 reaches the farthest distance, the vegetable then can be harvested and there is no need to transplant the vegetable. The hydroponic process is as such more convenient and efficient.

Figure 6:
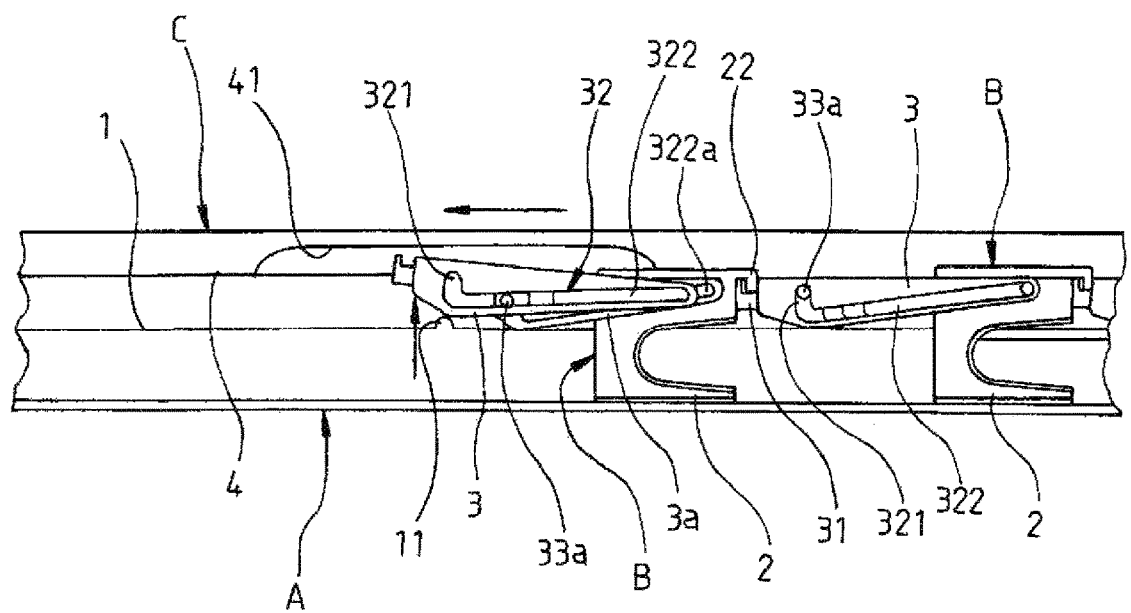
FIG. 6 is a sectional diagram showing another scenario of a number of cascaded frame members.

As shown in FIG. 6, appropriate distance is formed between the cascaded frame members B. In one scenario, a first frame member B can be placed on the support members A. Then, after a few days (e.g., 3 days), a second frame member B can be placed on the support members A and cascaded to the first frame member B. As the vegetables on the first and second frame members B grow, the extension elements can be pulled to provide room of growth. Firstly, as the outmost extension element 3 is pulled towards another end of the support members A, the arms of its U shape is raised upward by a pair of projections 11 on the support members A into indentations 41 on the ribs 4 of the cover member C (since each arm has a slant bottom side). The positioning pins 33a of the previous extension element 3a therefore enter the lateral sections 322 of the extension element 3's through slots 32 so as to facilitate the expansion of the outmost extension element 3 as the positioning pins 33a slide along the lateral sections 322.

Figure 7:
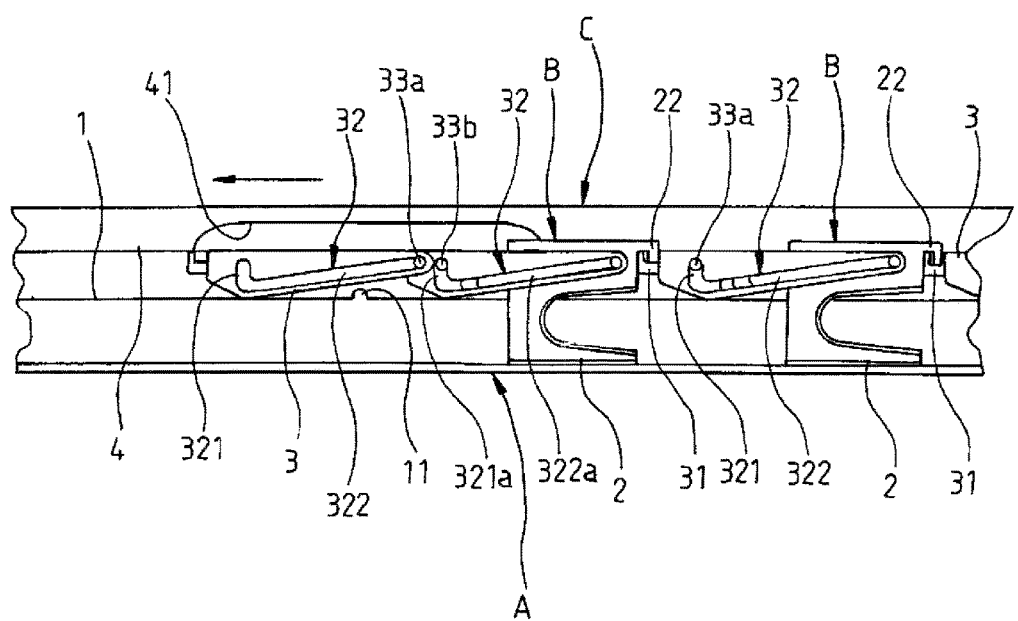
FIG. 7 is a sectional diagram showing yet another a scenario of a number of cascaded frame members.

As shown in FIG. 7, as the arms of the outmost extension element 3 run past the projections 11, the extension element 3 falls out of the indentations 41 and an appropriate distance is provided between the extension element 3 and the previous extension element 3a for the vegetables to grow. Please note that the projections 11 and the indentations 41 are arranged in accordance with the corresponding extension elements' position and expansion, so that the extension elements 3a, 3b, and 3c can be pulled and expanded as described above so as to incrementally increase the room of growth of the vegetables. After a period of time, the vegetables can be harvested from the outmost frame member B first towards those inner ones sequentially. There is no need to transplant the vegetables, thereby achieving an efficient hydroponic process.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:
1. A hydroponic device, comprising:
a plurality of support members, each having a flat top face and a plurality of projections arranged at intervals from an inner edge adjacent to a front end of the support member towards an outer edge adjacent to a back end;
at least a frame member placed on the support members; the frame member comprising a base element and a plurality of extension elements;
a cover member placed on the support members, the cover member comprising a plurality of downward extending ribs, each corresponding to an extension element of the plurality of extension elements and having an indentation corresponding to a protrusion;
wherein an outer most one of the plurality of extension elements interacts with adjacent one of the plurality of projections having the least distance thus requiring adjacent projections having succeeding larger distances to interact with succeeding smaller extension elements, the base element is for the installation of an absorbing piece where seeds are placed; each extension element has at least a through slot where a positioning pin of the base element or a previous extension element is slidably embedded; the base element and the extension elements are as such collapsible and expandable along a lateral direction on the support members so as to provide room for growth of the seeds.

2. The hydroponic device according to claim 1, wherein each extension element has an U shape; the extension elements have dimensions such that they are sequentially embedded in a space formed by a next extension element's U shape; each through slot is configured along an arm of the U shape; each through slot has a lateral section and a vertical section; each lateral section is arranged along a bottom side; the base element and the extension elements other than the outer most one of the plurality of extension elements have a positioning pin outwardly extended from an arm's corner of the U shape perpendicular to the arm; and the base element and the extension elements other than the outmost one has its positioning pins embedded in the through slots of a next extension element.

3. The hydroponic device according to claim 2, wherein each arm of the extension elements has a slant bottom side; when an extension element is pulled towards an end of the support members, the arms of its U shape is raised upward by a pair of projections on the support members into indentations on the ribs of the cover member; the positioning pins of the base element or a previous extension element therefore enter the lateral section of the through slot so as to facilitate the expansion of the extension elements.

4. The hydroponic device according to claim 1, wherein the base element has at least a hook along a front side; and a outmost extension element has a fastening piece along a back side so as to engage the hook of a next frame member;

and a plurality of frame members are cascaded by linking their respective hooks and fastening elements.

* * * * *